United States Patent
Tamminga

[19]

[11] Patent Number: 5,863,122
[45] Date of Patent: Jan. 26, 1999

[54] VERTICAL FEED MIXER WITH AUGER HAVING CORNERS

[76] Inventor: Jacob R. Tamminga, R.R.#2, Ontario, Canada, L0N 1N0

[21] Appl. No.: 748,801

[22] Filed: Nov. 14, 1996

Related U.S. Application Data

[60] Provisional application No. 60/006,680 Nov. 14, 1995.

[51] Int. Cl.⁶ .................................. B01F 7/24; B02B 3/06
[52] U.S. Cl. ........................ 366/314; 366/319; 366/323; 241/101.761; 241/260.1
[58] Field of Search ..................................... 366/314, 318, 366/319, 320, 322, 323, 324, 279; 241/101.76, 101.761, 260.1, 605, 186.5

[56] References Cited

U.S. PATENT DOCUMENTS

| | | | |
|---|---|---|---|
| 4,480,927 | 11/1984 | Peat et al. ................................. | 366/318 |
| 4,720,047 | 1/1988 | Knight et al. ............................. | 366/319 |
| 4,949,916 | 8/1990 | Wroblewski .......................... | 241/260.1 |
| 5,082,188 | 1/1992 | Urich ............................... | 241/101.761 |
| 5,429,436 | 7/1995 | Stone ....................................... | 366/314 |
| 5,456,416 | 10/1995 | Hartwig .................................. | 366/314 |
| 5,462,354 | 10/1995 | Neier ..................................... | 366/314 |
| 5,553,937 | 9/1996 | Faccia ..................................... | 366/314 |

*Primary Examiner*—Tony G. Soohoo
*Attorney, Agent, or Firm*—Daryl W. Schnurr

[57] ABSTRACT

A vertical feed mixer has a mixing chamber containing a rotatable auger having a generally helical flight that is tapered to converge from bottom to top. The flight has a periphery with several successive substantially straight sections where each straight section has a blade at a trailing end thereof. A curved vertical blade is mounted on the lowermost portion of the flight near the periphery. The mixer requires much less horsepower to mix the same amount of feed as conventional mixers.

17 Claims, 6 Drawing Sheets

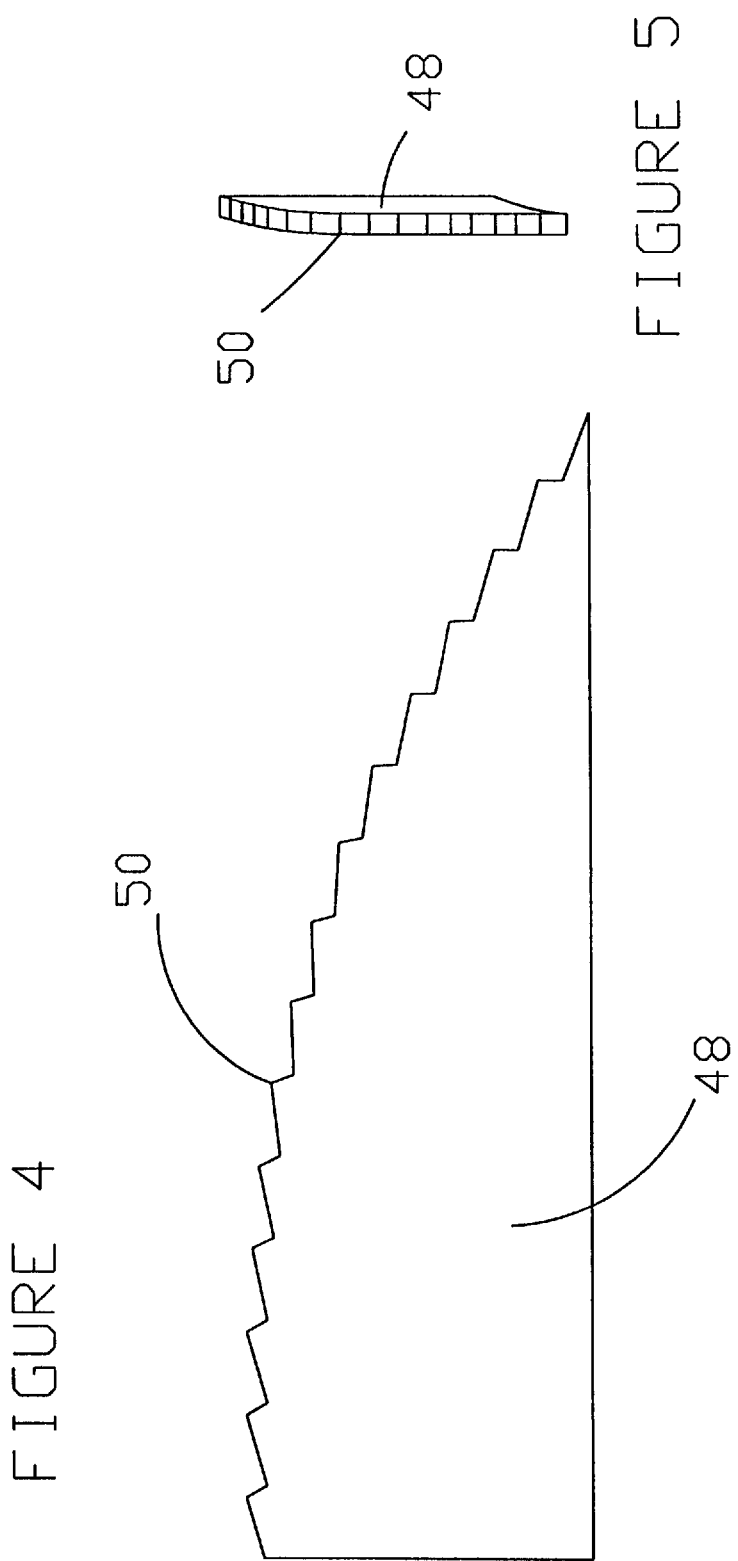

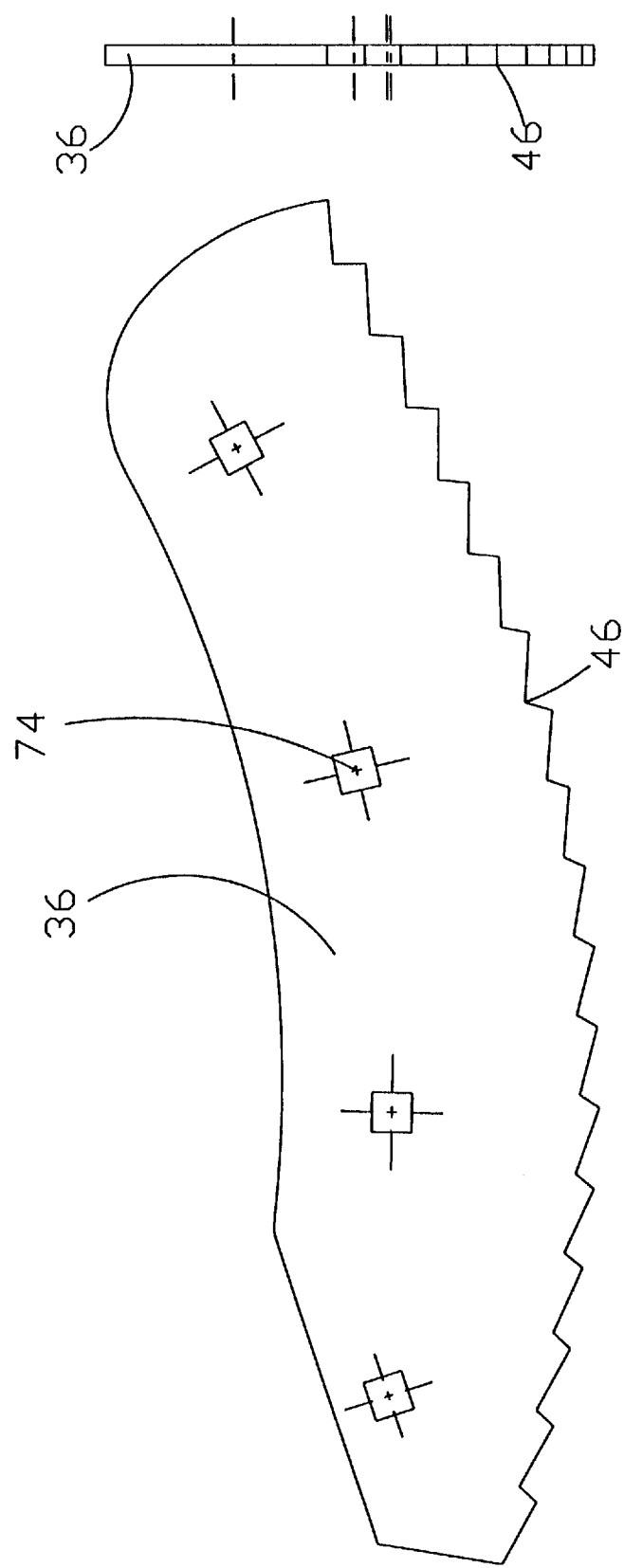

VERTICAL FEED MIXER WITH AUGER HAVING CORNERS

This is a prov. application of 60/006,680, filed Nov. 14, 1995.

BACLGROUND OF THE INVENTION

1. Filed of the Invention

This invention relates to a vertical feed mixer for use in mixing animal feed and, in particular, hay in any form including round bales with other animal feed.

2. Description of the Prior Art

Feed mixers of various forms are known and, in particular, feed mixers for mixing round bales of hay or haylage of any size, including large and small bales with other animal feedstuffs including corn silage, commodities, byproducts and concentrates are known. Previous vertical feed mixers have a vertically mounted. auger having a helically-shaped expanding periphery that is narrowest at a top and increases in size towards the base. It is known to have blades mounted periodically along the periphery of the auger. The periphery is smoothly curved in the form of a spiral and expands from top to bottom. These blades are sometimes serrated knives. One disadvantage of the existing feed mixers is that a large amount of horsepower is required to operate the mixers. Mixers of 500 to 600 cubic feet are common. Mixers of 300 to 350 cubic feet are also common. A 500 cubic foot mixer will take two round bales. Usually two tractors are required, one to provide power to the mixer and one to load the mixer, the power source for the mixer being the power take-off from a tractor.

SUMMARY OF THE INVENTION

It is an object of the present invention to provide a vertical feed mixer that has greatly reduced power requirements over conventional mixers because of the substantially straight sections on a periphery of the auger. Preferably, the periphery has a blade mounted at an end of each substantially straight section.

A vertical feed mixer has a mixing chamber containing a substantially vertical rotatable auger having a generally helical flight that is tapered to converge from bottom to top. The flight has a periphery of at least two substantially straight sections with power means to rotate said auger about a longitudinal center axis. The chamber has at least one opening to receive and discharge feed.

BRIEF DESCRIPTION OF THE DRAWINGS

FIG. 4 is an enlarged front view of a vertical blade;

FIG. 5 is an enlarged end view of the vertical blade of FIG. 4;

FIG. 6 is an enlarged top view of a horizontal blade;

FIG. 7 is an enlarged end view of the horizontal blade of FIG. 6; and

DESCRIPTION OF A PREFERRED EMBODIMENT

Figure 1:
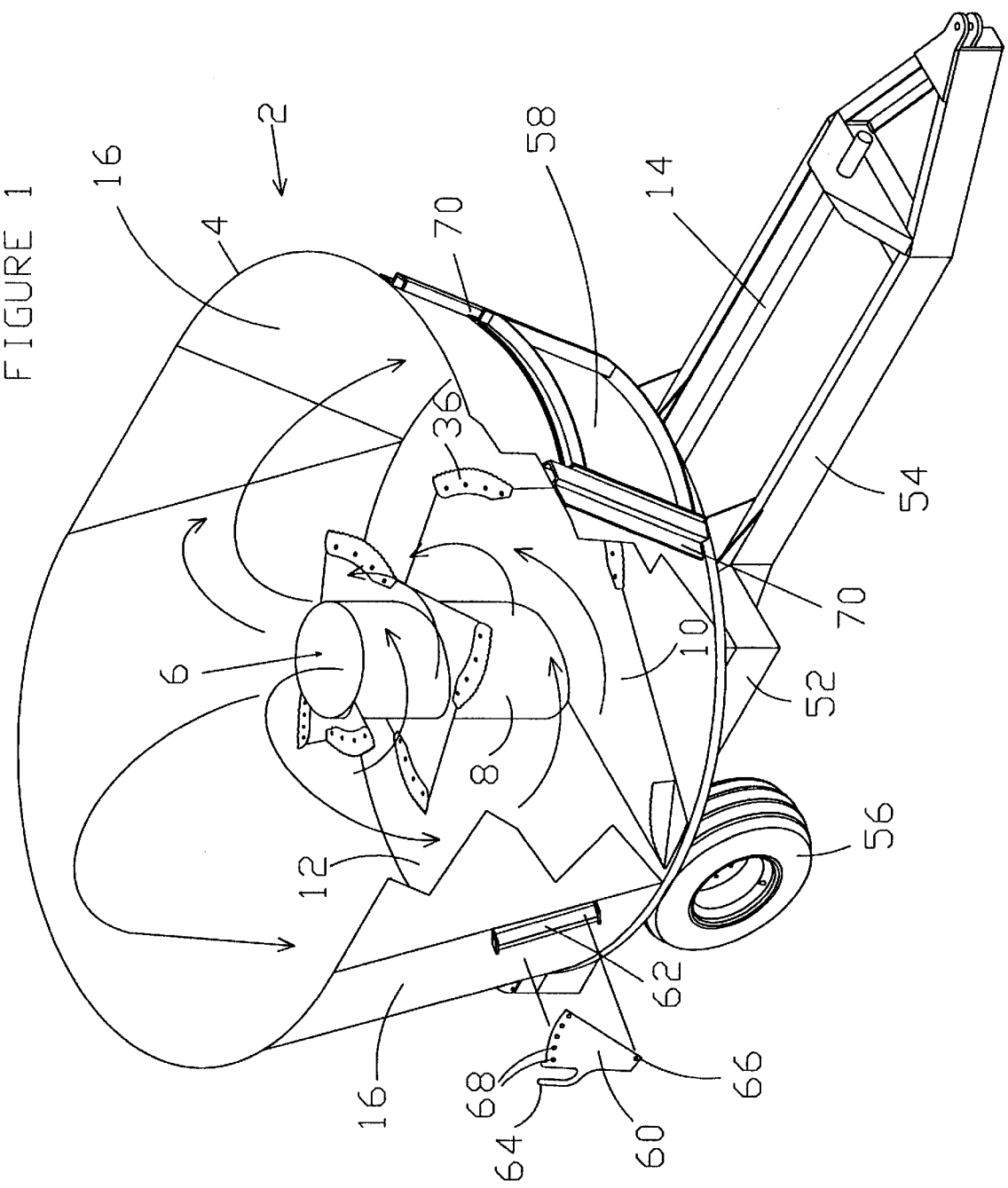
FIG. 1 is a partially cut-away perspective view of a vertical feed mixer to expose an auger with corners.
Figure 2:
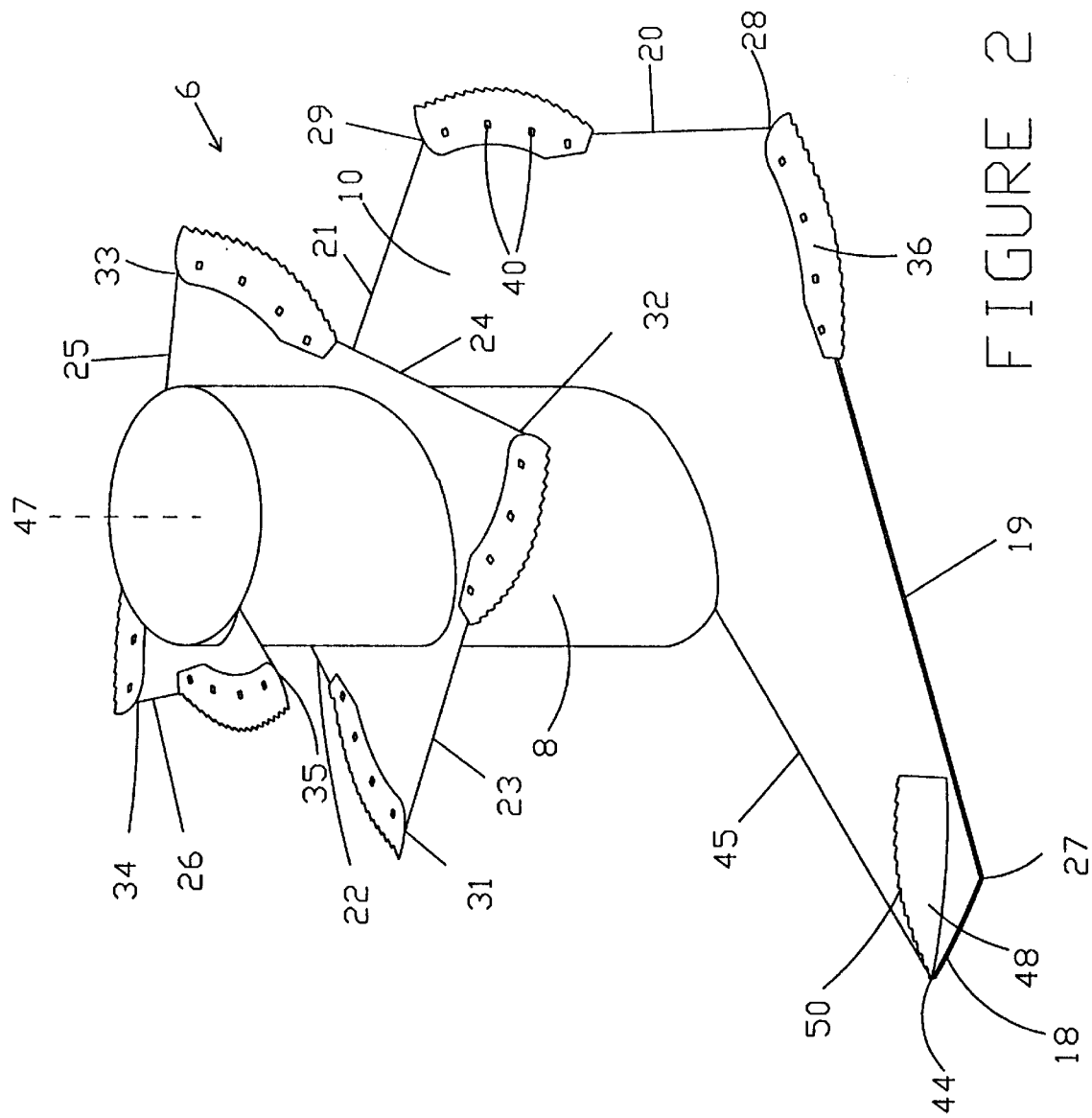
FIG. 2 is a perspective view of an auger of the mixer of FIG. 1.
Figure 3:
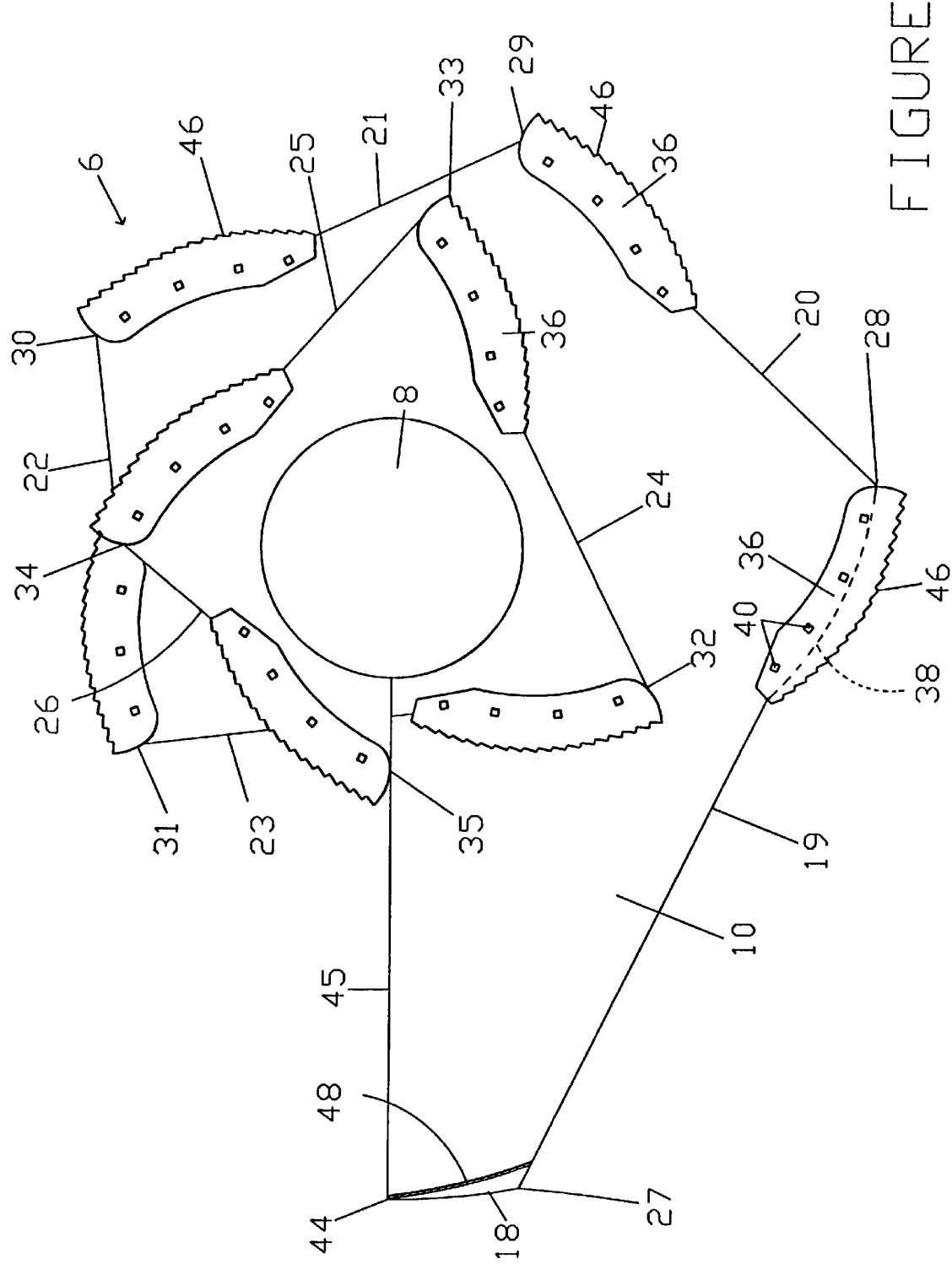
FIG. 3 is a top view of the auger of the mixer of FIG. 1.

In FIGS. 1, 2 and 3, a vertical feed mixer 2 has a mixing chamber 4 containing an auger 6. The auger is vertically mounted to rotate within the chamber 4. The auger 6 has a center tube 8 with a generally helically-shaped flight 10 extending from a top of said tube 8 to a base thereof. The mixing chamber 4 has a floor 12 and the tube 8 extends through the floor 12 to a gearing mechanism (not shown in FIG. 1) that is connected to a horizontal shaft 14. The tube 8, the gearing mechanism (not shown in FIG. 1) and the shaft 14 are conventional. The flight 10 increases in size from the top of the tube 8 to the base thereof. Just above the floor 12, the flight 10 is preferably sized to extend almost to an interior of a wall 16 of the chamber 4. The wall 16 diverges from bottom to top.

Preferably, an outermost edge 18 has approximately a one-quarter inch clearance from the interior wall 16 as the auger rotates. The outermost edge 18 can be straight, but preferably has an arcuate shape. A periphery of the flight 10 has a plurality of substantially straight sections 19, 20, 21, 22, 23, 24, 25, 26 located in succession along said periphery. The flight has corners 27, 28, 29, 30, 31, 32, 33, 34, 35 where the corner 27 is a first corner and the corner 35 15 is a last corner. The remaining corners 28, 29, 30, 31, 32, 33, 34 are located at an intersection of two substantially straight sections. Each substantially straight section has a leading end and a trailing end relative to a direction of rotation of the auger. In FIGS. 2 and 3, the auger will rotate clockwise when viewed from above.

Except for the first corner 27, each of the remaining corners has a horizontal blade 36 mounted on Et trailing end thereof. As can be seen from the dotted line at the corner 28, the periphery of the flight 10 has an outward curve 38 at each of said corners 28, 29, 30, 31, 32, 33, 34, 35 so that the horizontal blade 36 can be affixed to each corner by rivets (or other fastening means) 40. That part of the periphery extending between each of the horizontal blades 36 and the corners 27, 28, 29, 30, 31, 32, 33, 34 is straight.

The actual angles for each of the corners of the flight can vary with the size of the flight and the length of the substantially straight sections. Also, while the angles specified describe an auger that works well, the invention is not in any way restricted to specific angles. In FIG. 3, the angle of the first corner 27 is approximately 122°; the angle of the next corner 28 is approximately 105°; the angle of the next corner 29 is approximately 110°; the angle of the next corner 30 is approximately 106°; the angle of the next corner 31 is approximately 105°; the angle of the next corner 32 is approximately 103°; the angle of the next corner 33 is approximately 94°; the angle of the next corner 34 is approximately 100°; and the angle of the last corner 35 is approximately 55°. There is no horizontal blade at the first corner 27. The first corner 27 is connected to an outer end 44 of a lower leading edge 45 extending radially outward from the tube 8 to the periphery at the outer edge 18. The outer edge 18 can be straight, but is curved to form an arc of an imaginary circle with the leading edge 45 about a longitudinal center axis 47 of the auger 6. The periphery of the flight 10 from the outer end 44 to the tube 8 meets the tube radially just as the periphery of the flight 10 extending from the corner 35 to the tube 8 meets the tube radially.

From FIG. 3, it can be seen that the periphery of the flight 10 extending between the corner 20 and the tube 8 and the periphery extending between the outer end 44 and the tube 8 lie vertically above one another with the flight 10 extending for two complete turns about the tube 8. Preferably, the flight 10 and auger 6 have a minimum of 1.5 turns about the imaginary center axis 47 of the tube 8. The blades 36 have serrated outer edges 46 that extend outward from each substantially straight section. The edge of each blade 36 is arc-shaped. There is one vertical blade 48 mounted on a surface of the flight 10 near the first corner 27. The vertical blade 48 has a central portion that curves outward slightly from said center axis and moves the mixture towards the center of the mixer. In some designs, a second vertical blade (not shown) is located towards the tube 8 from the blade 48. The vertical blade 48 has a serrated upper edge 50 and is turned inward slightly from the direction of rotation. The blade 48 has a central portion that curves outward from the center axis of the auger.

From FIG. 1, it can be seen that the mixer 2 has a frame 52 with a tongue 54 and wheels 56 (only one of which is shown). The shaft 14 is designed to be connected to the power take-off (not shown) of a tractor (not shown). The chamber 4 has a discharge opening 58. A triangular baffle 60 is mounted in a slot 62 within the wall 16 of the chamber 4. The baffle 60 has a handle 64 and is pivotally mounted within the slot 62 at a base 66 in a conventional manner. A series of openings 68 along the upper edge of the baffle 60 represent degrees of penetration of the baffle within the chamber 4. A pin (not shown) is inserted into one of the openings 68 and into an opening (not shown) on a flange (not shown) in the wall 16 of chamber 4 to fix the degree of penetration by the baffle 60 into the chamber 4. When the handle is manipulated to insert the baffle into the chamber as far as it can be inserted, a finer mixture (not shown) results than would occur when the handle is manipulated, so that the baffle 60 does not extend into the chamber 4. Intermediate coarseness of the mixture results from intermediate settings. The frame, tongue, wheels, baffle, opening and chamber are conventional.

The arrows shown in FIG. 1 within the chamber 4 show the general movement of materials (not shown) that make up the mixture (not shown) during mixing. The auger 6 revolves clockwise when viewed from the top.

In a further embodiment (not shown) of the invention, an electric motor can be used. When an electric motor is used, only one tractor will be required to operate the mixer. That tractor will be used to load the mixer, the auger being rotated by the electric motor.

In operation, a round bale or other haylage is inserted into the mixer along with any other feedstuffs that are desired to be mixed with the hay. The auger is rotating as the mixing ingredients are being inserted and the auger continues to rotate until the desired degree of mixing is achieved and the mixed material is removed. When the mixing has been completed, the door 58 is raised (it slides upward along side ridges 70) and the mixture is removed by the auger which continues to rotate. Various conveyors (not shown) can be included to transport the mixture where desired. When the mixer is empty or nearly empty, the opening 58 is closed and the process is repeated to create another mixture.

In FIGS. 4 and 5, the one vertical blade 48 is shown having serrated outer edges 50. In FIGS. 6 and 7, the horizontal blade 36 is shown with serrated outer edge 46. Openings 74 receive rivets (not shown) or other fastening means.

Figure 8:
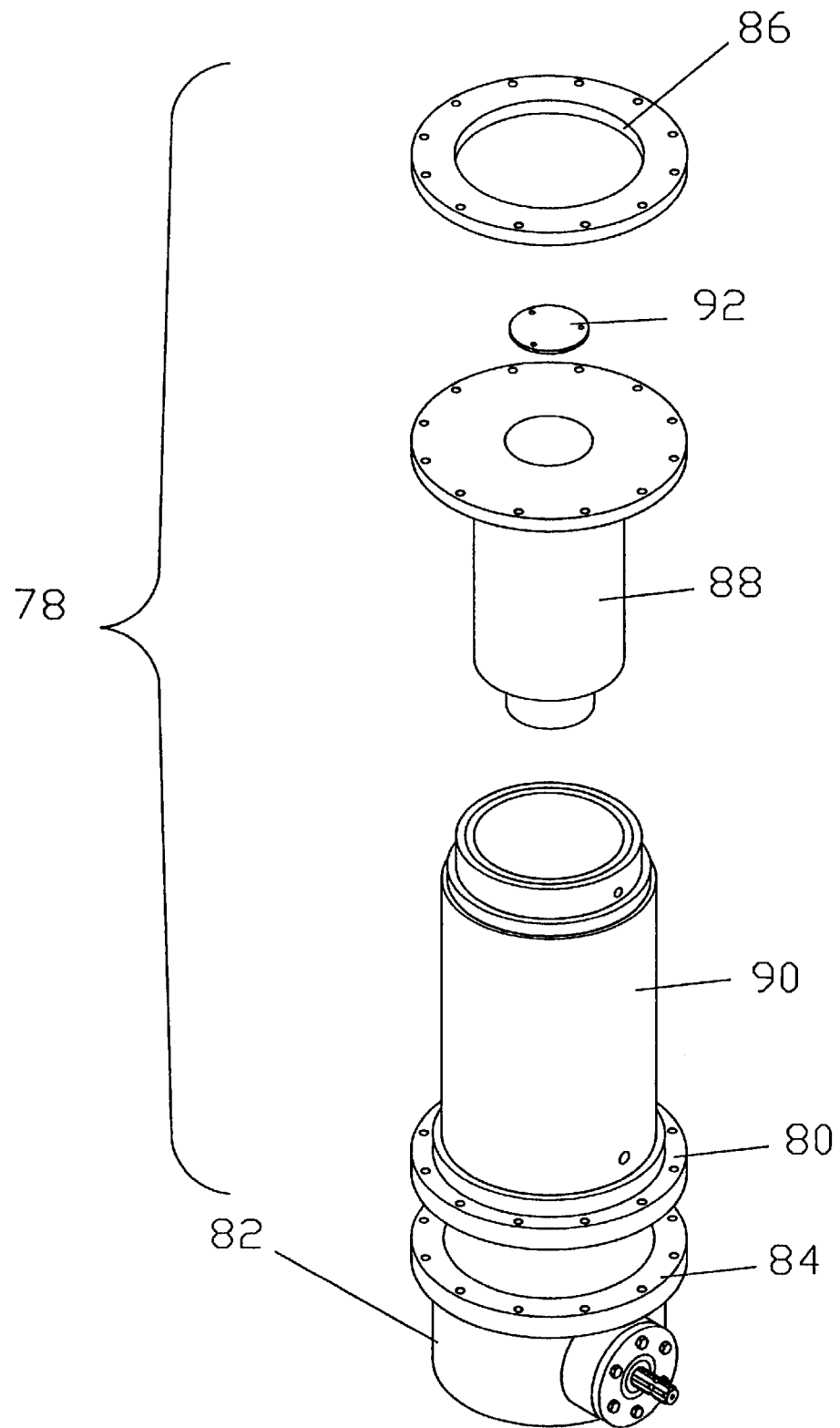
FIG. 8 is an exploded perspective view of a prior art bearing tower and gear box.

In FIG. 8, a bearing tower 78 has a flange 80 with a gear box 82 affixed to said flange 80 by a corresponding flange 84 using bolts and nuts (not shown). The tower 78 is mounted inside the center tube 8 (not shown in FIG. 8) of the auger 6 (not shown in FIG. 8). A ring 86 at a top of the tower 78 is welded to an inside of the tube 8 (not shown in FIG. 8). The ring 86 is bolted to an inner tower 88 by bolts and nuts (not shown). The inner tower 88 is slidably mounted into an outer tower 90 that is welded to a floor 12 (not shown in FIG. 8) of the mixing chamber 4 (not shown in FIG. 8). The gear box 82 is mounted beneath the tower 78. A small ring 92 couples the gear box 82 to the inner tower 88 by bolts and nuts (not shown). This connection is made inside the inner tower 88 and the actual connection is not shown in FIG. 8. The tower 78 and gear box 82 are conventional and are therefore not further discussed.

While the auger 6 extends for two complete revolutions around the tube 8, other auger designs might extend further than or less than two revolutions. Other augers might have more corners or fewer corners or might have fewer horizontal blades or more horizontal blades. The periphery of the auger itself could be sharpened to form a blade that is integral with the flight. The advantage of using blades that are riveted or affixed by other fastening means to the flight is that the blades can be replaced when they become worn or damaged or can be easily sharpened when they become dull.

Each horizontal blade 36 has a forward end and a rearward end relative to the direction of rotation. Preferably, the substantially straight sections have sufficient length and are oriented so that the rearward end of a each blade is a greater distance from the center axis of the auger than the forward end of each blade. Still more preferably, the rearward end of each blade is greater than four inches further from the center axis than the forward end of the same blade. When the substantially straight sections are adjacent to one another, a first corner is located at a leading end of the first section and the last corner is located at a trailing end of the last section. In addition, there is a corner at the intersection of every two adjacent sections. The rearward end of each blade 36 extends to a corner and there is one blade at each corner except for the first corner. Preferably, when the flight extends for two turns, the auger has eight substantially straight sections and eight corners in addition to the first corner. A second corner is located immediately after the first corner along the periphery and the second corner has a first blade with a rearward end located a distance of approximately 5.75 inches further from the center axis of the auger than a distance at the forward end of the same blade from the center axis. A third corner is located immediately after the second corner and the third corner has a second blade with a rearward end located a distance of approximately 5.25 inches further from said center axis than the forward end of the same blade. The remaining blades are located at the remaining corners above said second blade along said periphery having rearward ends that are located a distance of approximately 4.5 inches further from the center axis of the auger than the forward end of each of these remaining blades.

Since the mixer of the present invention uses much less horse power than previous mixers to mix the same amount of feed much less fuel is consumed and a smaller tractor can be utilized as the power source. Also, it has been found that the mixing is completed more quickly with the mixer of the present invention than with conventional mixers for the same amount of feed. It has also been found that more feed can be loaded into the mixing chamber of the present invention than can be loaded into conventional mixers of the same size without clogging the mixer. When a mixer clogs, the feed (for example, a round bale) is pushed around the mixer by the auger without the auger cutting through the bale. When the mixer becomes clogged, the efficiency drops drastically and a great deal of time is spend unclogging the mixer.

I claim:

1. A vertical feed mixer comprising a mixing chamber containing a substantially vertical rotatable auger having a generally helical flight that is tapered to converge from bottom to top, said flight having a periphery with a plurality of substantially straight sections, with power means to rotate said auger about a longitudinal center axis, said chamber having at least one opening to receive and discharge said feed, said flight extending for at least one and one-half revolutions about said center axis, said flight having a lower leading edge extending outward to a periphery and at least two of said substantially straight sections being adjacent to one another, each substantially straight section having a leading end and a trailing end relative to a direction of rotation of said auger, said trailing end having cutting means thereon.

2. A mixer as claimed in claim 1 wherein said cutting means is a blade.

3. A mixer as claimed in claim 2 wherein said periphery at said leading edge is slightly smaller than a radius of said mixing chamber, adjacent to said leading edge.

4. A mixer as claimed in claim 2 wherein said blade has an edge that extends outward from said substantially straight section.

5. A mixer as claimed in claim 4 wherein the edge of each blade is arc-shaped.

6. A mixer as claimed in claim 4 wherein each blade has a forward end and a rearward end, the substantially straight sections having sufficient length and being oriented so that said rearward end of each blade is a greater distance from said center axis than said forward end.

7. A mixer as claimed in claim 6 wherein said rearward end of each blade is greater than four inches further from said center axis than said forward end of the same blade.

8. A mixer as claimed in claim 7 wherein said substantially straight sections are adjacent to one another, with a first corner located at a leading end of a first section and a last corner located at a trailing end of a last section as well as a corner at an intersection of every two adjacent sections, said rearward end of each blade extending to a corner, there being one blade at each corner except for said first corner.

9. A mixer as claimed in claim 8 wherein said flight extends for two turns, said auger having eight substantially straight sections and eight corners in addition to said first corner, a second corner located immediately after said first corner along said periphery, said second corner having a first blade with a rearward end located a distance of approximately 5.75 inches further from said center axis than a distance of said forward end of said first blade from said center axis, a third corner located immediately after said second corner, said third corner having a second blade with a rearward end located a distance of approximately 5.25 inches further from said center axis than said forward end of said second blade and the remaining blades located at the remaining corners above said second blade along said periphery having rearward ends that are located a distance of approximately 4.5 inches further from said center axis than the forward end of each of said remaining blades.

10. A mixer as claimed in claim 9 wherein a first corner has an angle of approximately 122°, said second corner has an angle of approximately 105°, said third corner has an angle of approximately 110°, a fourth corner immediately following said third corner has an angle of approximately 106°, a fifth corner immediately following said fourth corner has an angle of approximately 105°, a sixth corner immediately following said fifth corner has an angle of approximately 103°, a seventh corner immediately following said sixth corner has an angle of approximately 94°, an eighth corner immediately following said seventh corner has an angle of approximately 100° and said last corner located immediately following said eighth corner having an angle of approximately 55°.

11. A mixer as claimed in claim 8 wherein there is a vertically mounted blade mounted on a surface of said flight adjacent to said first corner, said vertically mounted blade being turned inward slightly from the direction of rotation.

12. A mixer as claimed in claim 11 wherein said vertically mounted blade has a central portion that curves outward from said center axis.

13. A mixer as claimed in any one of claims 4 or 5 wherein each substantially straight section curves outward beneath each blade.

14. A mixer as claimed in any one of claims 2, 4 or 5 wherein each blade has a serrated edge.

15. A mixer as claimed in any one of claims 1, 4 or 6 wherein the power source is the power take-off of a tractor and there is a gear box to transmit rotational movement from said power take-off to said auger.

16. A mixer as claimed in any one of claims 1, 4 or 6 wherein said mixing chamber has a side wall, said side wall containing a second opening having a barrier to allow said opening to be opened and closed.

17. A mixer as claimed in any one of claims 1, 4 or 6 wherein the mixing chamber has side walls that diverge from one another from bottom to top.

* * * * *